US012675285B2

(12) United States Patent
Narasimha Murthy et al.

(10) Patent No.: US 12,675,285 B2
(45) Date of Patent: Jul. 7, 2026

(54) MANAGING APPLICATIONS ACROSS MULTIPLE DEVICES

(71) Applicant: Omnissa, LLC, Mountain View, CA (US)

(72) Inventors: Anikethana Narasimha Murthy, Palo Alto, CA (US); David Shaw, Atlanta, GA (US); Partheeban Kandasamy, Bellevue, WA (US); Basalingayya Karamadi, Bangalore (IN); Makrand Sethi, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 37 days.

(21) Appl. No.: 18/135,761

(22) Filed: Apr. 18, 2023

(65) Prior Publication Data

US 2024/0248710 A1     Jul. 25, 2024

(30) Foreign Application Priority Data

Jan. 25, 2023    (IN) ............................. 202341005045

(51) Int. Cl.
    *G06F 9/44*        (2018.01)
    *G06F 8/61*        (2018.01)
    *G06F 8/71*        (2018.01)

(52) U.S. Cl.
    CPC . *G06F 8/71* (2013.01); *G06F 8/62* (2013.01)

(58) Field of Classification Search
    None
    See application file for complete search history.

(56) References Cited

U.S. PATENT DOCUMENTS

| | | | | |
|---|---|---|---|---|
| 9,098,369 B1 * | 8/2015 | Lewis | ................ | G06Q 30/0267 |
| 10,303,465 B1 * | 5/2019 | Potter | ..................... | H04L 67/34 |
| 2011/0067023 A1 * | 3/2011 | Chiyo | ................ | H04N 1/00222 |
| | | | | 717/177 |
| 2012/0266157 A1 * | 10/2012 | Mun | ................... | G06F 9/45533 |
| | | | | 717/174 |
| 2013/0326502 A1 * | 12/2013 | Brunsman | ................ | G06F 8/61 |
| | | | | 717/177 |
| 2014/0013319 A1 * | 1/2014 | Hehir | ...................... | G06F 9/453 |
| | | | | 717/176 |
| 2015/0095905 A1 * | 4/2015 | Chakrabarti | ....... | G06Q 30/0241 |
| | | | | 717/178 |
| 2015/0186127 A1 * | 7/2015 | Hoy | .......................... | G06F 8/63 |
| | | | | 709/222 |
| 2016/0188312 A1 * | 6/2016 | Shi | ........................... | G06F 8/62 |
| | | | | 717/176 |
| 2017/0318123 A1 * | 11/2017 | Amrhein | ................. | H04W 4/50 |
| 2018/0176326 A1 * | 6/2018 | Shantharam | .......... | H04L 69/329 |
| 2020/0409685 A1 * | 12/2020 | Shimomoto | ........... | G06F 8/654 |

* cited by examiner

*Primary Examiner* — Lanny N Ung
(74) *Attorney, Agent, or Firm* — Kim & Stewart LLP

(57) ABSTRACT

A management service can receive an installation request for a client application from a first client device, where the installation request specifies a second client device on which the client application is to be installed. The management service can identify an operating system associated with the second client device. The management service can request installation of the client application on the second client device from an application catalog service associated with the operating system of the second client device.

14 Claims, 5 Drawing Sheets

MANAGING APPLICATIONS ACROSS MULTIPLE DEVICES

RELATED APPLICATION

Benefit is claimed under 35 U.S.C. 119(a)-(d) to Foreign Application Serial No. 202341005045 filed in India entitled "MANAGING APPLICATIONS ACROSS MULTIPLES DEVICES", on Jan. 25, 2023 by VMware, Inc., which is herein incorporated in its entirety by reference for all purposes.

BACKGROUND

Today, users often own and regularly use multiple devices. This is particularly true in the enterprise space, where the bring-your-own-device (BYOD) paradigm has led to employees using several devices for their work. In many cases, each device an employee uses may include a different operating system. Each of these devices may obtain applications using a different "app store"—or application catalog—that includes applications specific to a particular operating system. Thus, each device may use applications that are incompatible with the user's other devices, even if a same application has available several different versions designed for different operating systems.

DETAILED DESCRIPTION

Disclosed are various approaches for managing applications across multiple devices. Enterprise users may use multiple devices on a daily basis. This often includes installing and managing applications on the user's various devices. But the user must do so on each device individually, especially when the user's devices include multiple different operating systems.

The disclosed approaches, however, enable a user to manage applications on all of that user's devices from a single device. For example, an enterprise user may use a first device to install an application on not only that first device, but also on any other of the user's devices enrolled for management by the enterprise. The use may even choose to install an application on multiple devices simultaneously. This remains true even if the two devices use different operating systems. The disclosed approaches also enable a user to manage the configurations of all the user's enrolled devices from a single device.

To manage applications across multiple devices, an enterprise user can request one or more actions be performed with respect to one or more of the user's devices. As in the above example, the user operating a first client device may request that a client application be installed on a second client device (and any other client devices) associated with that user. The first client device can provide this request to a management service that manages the user's various client devices. The management service can then provide the request to the appropriate application catalog services, each of which can deploy its version of the application to the corresponding client device. As another example, the user can use the first client device to request that a particular configuration be applied to the second client device—that is, to the second client device itself or to any application(s) installed on the second client device. This configuration can correspond to a configuration profile defined by an enterprise administrator. The first client device can provide this request to the management service, which can deploy the corresponding configuration profile to the second client device.

Figure 1:
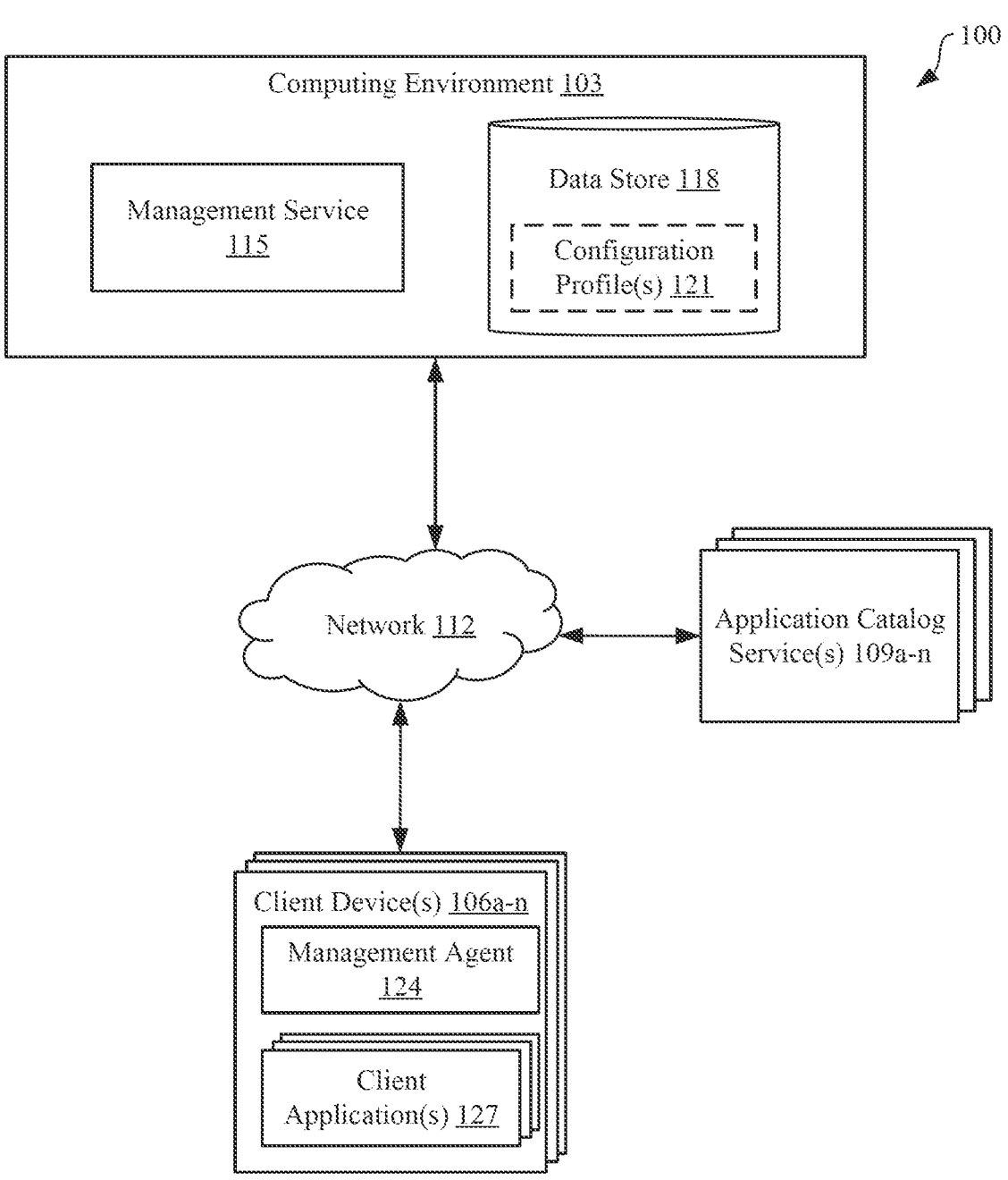
FIG. 1 shows an example of a networked environment, according to various embodiments of the present disclosure.

FIG. 1 shows an example of a networked environment 100 according to various embodiments. The networked environment 100 can include a computing environment 103, client devices 106a-n, and one or more application catalog services 109a-n in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the client devices 106. In that context, the computing environment 103 can execute a management service 115 and potentially other application(s). The computing environment 103 can also include a data store 118.

The data store 118 can include memory of the computing environment 103, mass storage resources of the computing environment 103, or any other storage resources on which data can be stored by the computing environment 103. The data store 118 can include one or more databases, such as a structured query language (SQL) database, a non-SQL database, or other appropriate database. The data stored in the data store 118, for example, can be associated with the operation of the various applications or functional entities described below. The data store 118 can include one or more configuration profiles 121 and potentially other types of data.

Configuration profiles 121 can represent settings, plug-ins, configuration files and/or other data capable of configuring, controlling, and/or influencing the operations and/or functions of a client device 106 and/or applications installed on a client device 106. Configuration profiles 121 can be specific to, for example, Apple iOS™, Apple OSX™, Samsung KNOX™, Samsung SAFE™, Google Android™, Windows Mobile™, Windows™, Blackberry™, Symbian™, or other platforms or operating systems of the client device 106, as well as applications compatible with those platforms or operating systems.

Configuration profiles 121 can comprise one or more indications of the state of client device 106. For instance, a configuration profile 121 can represent hardware specifications of client device 106, version and configuration information of various software programs and hardware components installed on client device 106, data transmission protocols enabled on client device 106, version and usage information of various resources stored on client device 106, and/or any other attributes associated with the state of client device 106.

The management service 115 can be executed to administer the operation of client device(s) 106 that are enrolled or otherwise registered with the management service 115. To this end, the management service 115 can also provide mechanisms for a client device 106 to enroll or otherwise register with the management service 115. The management can also install or cause to be installed various applications on the client device 106 or for various configuration settings of the client device 106 to be set to a specified value. The management service 115 can enroll the client device(s) 106 in association with a user account corresponding to a user of the client devices.

The management service 115 can handle requests to manage applications and configuration of various client devices 106 associated with a particular user. For instance, a user can use a first client device 106a to request that installation, uninstallation, or some other action be performed with respect to an application on a second client device 106b or any other client device 106 associated with that user and enrolled with the management service 115. An action request from a client device 106 can include an identifier of the requesting client device 106, an identifier of a target client device 106 on which the action is to be performed, and any information that can allow the management service 115 to facilitate performance of the requested action. For example, if the requested action is to install an application on a particular client device 106, the action request can specify an identifier or other information regarding the application (or, if applicable, an identifier for a configuration profile 121 associated with the application), or any configuration settings to be implemented when the application is installed. To give another example, if the requested application is to configure a particular client device 106 to use a specified virtual private network (VPN), the request can include an identifier for a configuration profile 121 associated with the specified VPN.

How the management service 115 handles an action request for an application can depend on, as an example, whether the application is a public application or an internal application. A public application can be an application that is freely available for users to install from an application catalog service 109. An internal application can be an application associated with an enterprise or other organization that is only available to affiliates of that enterprise. In some implementations, the management service 115 can determine whether the application is a public application or an internal application based on whether the data store 118 comprises a configuration profile 121 including a installation package for the internal application.

If an application is an internal application, the management service 115 can itself perform the requested action. But if the application is a public application, the management service 115 can determine that the action is performable by an application catalog service. In some implementations, though, a requested action could be performable by the management service 115 even if an application is a public application.

The management service 115 can itself handle an action request for an internal application. In some implementations, the management service 115 can identify a configuration profile 121 associated with the internal application using information provided with the action request. If the action request is to install the internal application, for example, the management service 115 can retrieve installation package that can be deployed to a target client device 106 specified by the action request to install the application. As another example, if the action request is to reconfigure the internal application, the management service can deploy the corresponding configuration profile 121, including one or more configuration settings, to the target client device 106.

The management service 115 can provide an action request for a public application to an appropriate application catalog service 109. The appropriate application catalog service 109 can host an application catalog that includes or is compatible with the application, which can depend on an operating system of the target client device 106. To illustrate, suppose a client device 106 using an Android™ operating system requests installation of an application. The management service 115 can determine that the application (or a version of the application compatible with the Android™ operating system) is available in the Google Play™ store. The management service 115 can then provide the request to an application catalog service 109 associated with the Google Play™ store using, for example, an application programming interface (API) call. In some implementations, if the action request also specifies a particular configuration profile 121 based on which the application is to be configured, the management service 115 can then deploy that configuration profile 121 to the target client device 106.

The management service 115 can deploy an installation package and/or configuration profile 121 to a client device 106 along with a command to cause the client device 106 to perform the corresponding installation and/or configuration. In some implementations, the management service 115 can provide a command directly to the management agent 124. In other implementations, the management service 115 can place the command in a command queue accessible to the client device 106. A command to install the application can include a network address or URL where the installation package can be downloaded for installation. A command to configure the client device 106 or an application using a configuration profile 121 can include a network address or URL where the configuration profile 121, or configuration settings associated with the configuration profile 121, can be downloaded for installation.

In some implementations, the management service 115 can provide a catalog of applications that are installed and/or could be installed on a user's client devices 106. The management service 115 can identify a corresponding application catalog service 109 for each of the user's client devices 106 enrolled with the management service 115 and query each application catalog service 109. Each application catalog service 109 can provide the management service 115 with access to a catalog of compatible applications, and the management service 115 can in turn enable the client device 106 to access these catalogs. In addition, the management service 115 can identify one or more internal applications compatible with the user's client devices 106 from the configuration profiles 121 and provide a catalog of those internal applications to the client device 106.

The client device 106 can be representative of a plurality of client devices 106*a-n* that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection. The client device 106 can be configured to execute a management agent 124 and one or more client applications 127.

The management agent 124 can be executed to register or enroll the client device 106 with the management service 115 and to implement or enforce compliance with various commands or instructions provided by the management service 115. The management agent 124 can be installed with elevated privileges or be effectuated through application programming interface(s) (API(s)) provided by an operating system of the client device 106 to manage the client device 106 on behalf of the management service 115. The management agent 124 can have the authority to manage data on the client device 106; to install, remove, or disable certain applications; or to install configuration profiles, such as VPN certificates, Wi-Fi profiles, email profiles, or other profiles for configuring various functions or applications of the client device 106. The management agent 124 can be enrolled or otherwise registered with the management service 115. The management agent 124 may be in compliance with policies enforced by the management service 115.

The management agent 124 can enable a user to perform a specified actions with respect to a client application 127 on any of the client devices 106 associated with that user. The management agent 124 can provide a user interface 130 that presents one or more client applications 127 that are installed on the user's client devices 106, as well as applications that may be installed on one or more of the user's client devices 106. For client applications 127 installed on the user's client devices 106, the management agent 124 can present in the user interface 130 one or more actions that are performable with respect to each client application 127. For example, the management agent 124 can enable a user to uninstall a client application 127 from any client devices 106 on which it is installed, modify a configuration of a client application 127 based on configuration profile(s) 121, or install the client application 127 on any additional client applications with which the client application 127 is compatible.

When a user selects one of these actions with respect to a client application 127, the management agent 124 can generate an action request and provide the request to the management service 115. An action request can include an identifier of the client device 106, and identifier of the target client device 106 on which the action is to be performed, and information that can allow the management service 115 to facilitate performance of the requested action. For example, the request can specify an identifier for the client application 127 and any identify any configuration profile(s) 121 based on which the action will be performed. The management agent 124 can request information regarding any configuration profiles 121 that are relevant to the user's client devices 106 or client application(s) 127.

The management agent 124 can also enable a user to install client applications 127 on any of the user's client devices 106 with which they are compatible. For example, the user interface 130 can present a catalog of applications that are available for each of the user's client devices 106. The management agent 124 can obtain this catalog by querying the management service 115.

The management agent 124 can execute commands provided by the management service 115 or an application catalog service 109. These commands can cause the management agent 124 to install a client application 127, configure the client device 106 or a client application 127 based on a configuration profile 121, or perform other action. In some implementations, the management service 115 or application catalog service 109 can provide a command directly to the management agent 124. And in some implementations, the management agent 124 can determine whether a command queue provided by the management service 115 for the respective client device 106 contains any commands or resources for the client device 106, for example, a command to install an installation package, or a command to configure a client device 106 or a client application 127 based on a configuration profile 121. A command to install the client application 127 can include a network address or URL where the installation package can be downloaded for installation. A command to configure the client device 106 or client application 127 using a configuration profile 121 can include a network address or URL where the configuration profile 121, or configuration settings associated with the configuration profile 121, can be downloaded for installation. The management agent 124 can cause the commands or resources to be downloaded and/or implemented on the client device 106.

The client applications 127 can represent applications installed on a client device 106. can be executed in a client device 106 to access network content served up by the computing environment 103, application catalog services 109, or other servers or computing devices, thereby rendering a user interface on a display. For example, the client application 127 can include a browser, a dedicated application, or other executable, and the user interface can include a network page, an application screen, or other user mechanism for obtaining user input. As another example, the client application 127 can include email applications, social networking applications, word processors, spreadsheets, or other applications.

The application catalog service 109 can provide application catalog functionality to client devices 106. In particular, the application catalog service 109 is configured to generate a listing of public applications that are available to be deployed (e.g., installed, configured) to client devices 106. In this regard, the application catalog service 109 can encode one or more user interfaces that present the application catalog to the management service 115 or to a client device 106 for rendering on the client device 106. Data relating to these user interfaces can correspond to a hypertext markup language (HTML) code, images, extensible markup language (XML) code, JavaScript object notation (JSON) data, yet another markup language (YAML) data, or other user interface data.

The application catalog service 109 can receive requests from the management service 115 to install or uninstall an application on one or more client devices 106 specified by the request. For example, if the request includes installation of a particular application on target client device(s) 106, the application catalog service 109 can generate an installation package that will enable target client device(s) 106 to install the application. The application catalog service 109 can deploy the installation package to target client device(s) 106 along with a command to install the application. For requests to uninstall an application, the application catalog service 109 can generate the command and deploy to the target client device(s) 106. When deploying a command to target client device(s) 106, the application catalog service 109 can provide the command directly to the target client device(s) 106 or place the command in a command queue accessible to the target client device(s) 106.

Figure 2A:
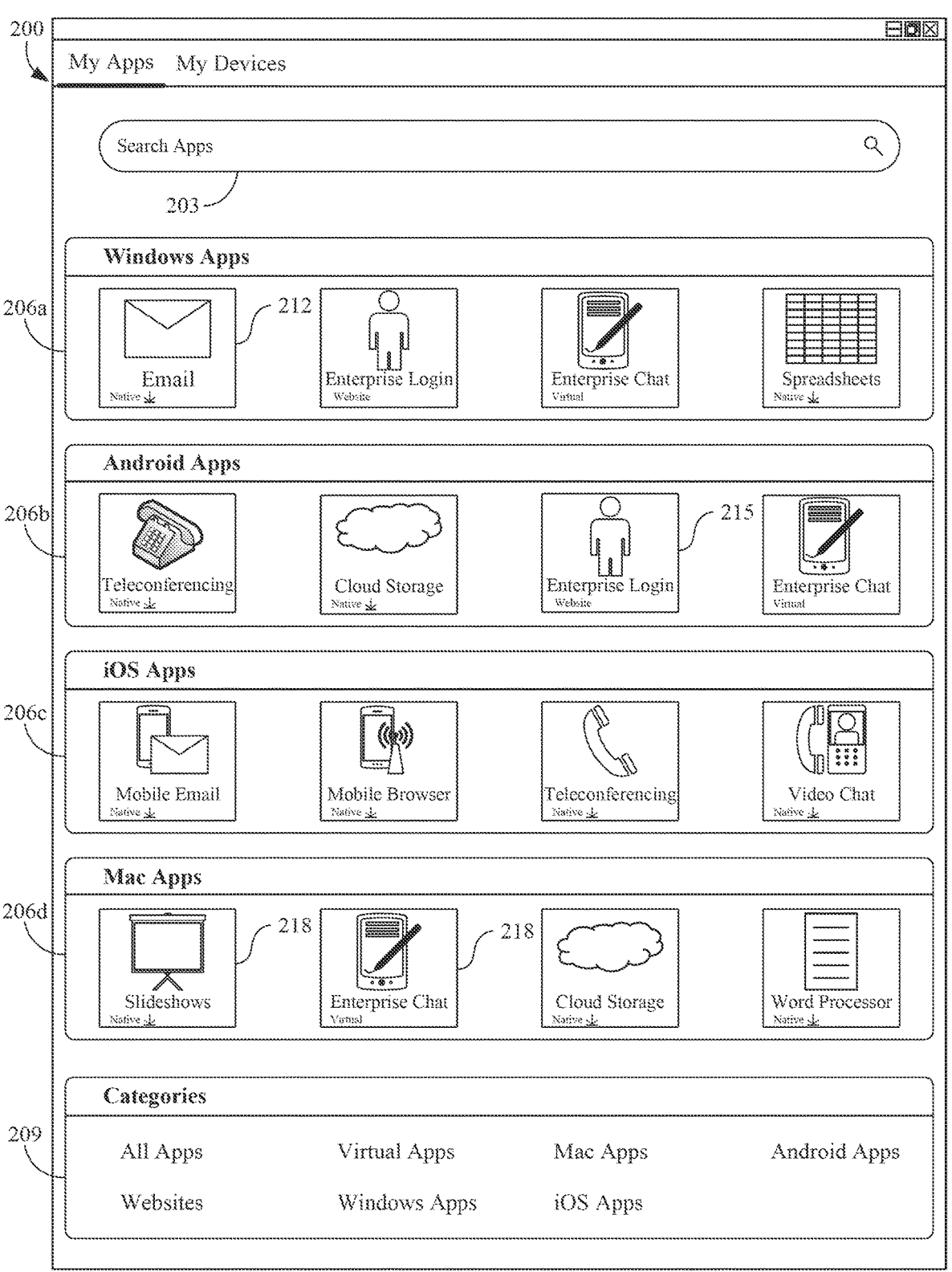
FIG. 2A shows an example of an application detail user interface, according to various embodiments of the present disclosure.
Figure 2B:
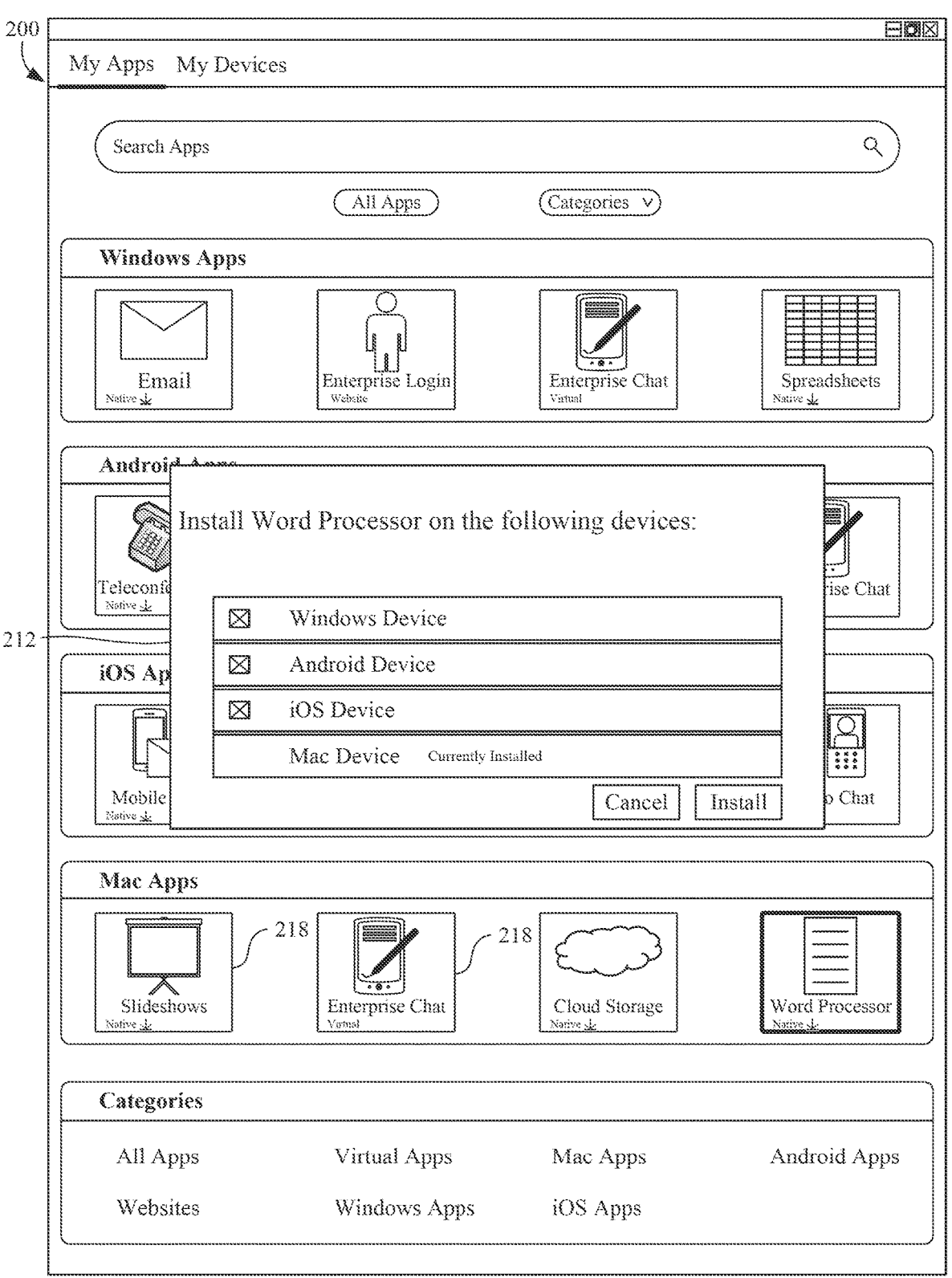
FIG. 2B shows an example of the application detail user interface 200 including an installation prompt, according to various embodiments of the present disclosure.
Figure 2C:
FIG. 2C shows an example of a device detail user interface, according to various embodiments of the present disclosure.

FIGS. 2A-2C show examples of user interfaces rendered by the management agent 124 in a display of a client device 106. FIG. 2A shows an example of an application detail user interface 200. The application detail user interface 200 can enable a user to view a catalog of client applications 127 installed across that user's client devices 106 sorted based on device, operating system, application type, or other criteria. The application detail user interface 200 can include an application search bar 203, a plurality of platform-specific application boxes 206, a category selection box 209, and potentially other components. The application search bar 203 can enable a user to perform keyword searches of the user's client applications 127, as well as potentially applications compatible with the user's client device(s) 106 but not yet installed on a client device 106. The platform-specific application boxes 206 can each include a catalog of installed client applications 127 sorted based on platform or operating system. Each client application 127 can be represented by an icon that includes a name of the client application 127 and a category of the client application 127, i.e., native (designed for and downloaded onto a particular client device 106), virtual, or website (accessed via a web browser). In some implementations, a user can interact with a client application 127 icon to call up a menu that enables the user to manage that client application 127. The category selection box 209 can include various selectable components that can be used to filter the displayed client applications 127 based on various criteria, such as platform or operating system; classification as a native application, virtual application, or website-based application; or other criteria.

FIG. 2B shows an example of the application detail user interface 200 including an installation prompt 212. In some implementations, the installation prompt 212 can be displayed when a user interacts with an icon corresponding to a particular client application 127. The installation prompt 212 can enable a user to install a selected client application 127 on one or more client devices 106 on which the client application 127 is not yet installed. When a user selects to install a client application 127 on a particular client device 106, the management agent 124 can provide an installation request to the management service 115. The management agent(s) 124 on the target client device(s) 106 can then receive an installation package for the client application 127 from the management service 115 or application catalog service 109, depending on whether the client application 127 is public or internal.

FIG. 2C shows an example of a device detail user interface 215. The device detail user interface 215 can include information on each client device 106 enrolled for a user, including any client applications 127 installed thereon. The device detail user interface 125 can include a device information menu 218 for each client device 106 that can be accessed by selecting a selectable component for each client device 106. Each device information menu 218 can include a corresponding application management menu 221. The application management menu 221 can list client applications 127 compatible with the client device 106, as well as the installation status for each client application 127, e.g., installed, not installed, or currently installing. The application management menu 221 can further include a selectable component for each client application 127 that allows a user to perform an action based on the installation status of a selected client application 127. For example, a user can uninstall an installed client application 127, installed a non-installed client application 127, or cancel an ongoing installation of a client application 127. Selecting one of these selectable components can trigger the management agent 124 to generate and provide an action request to the management service 115 to carry out the requested action.

Figure 3:
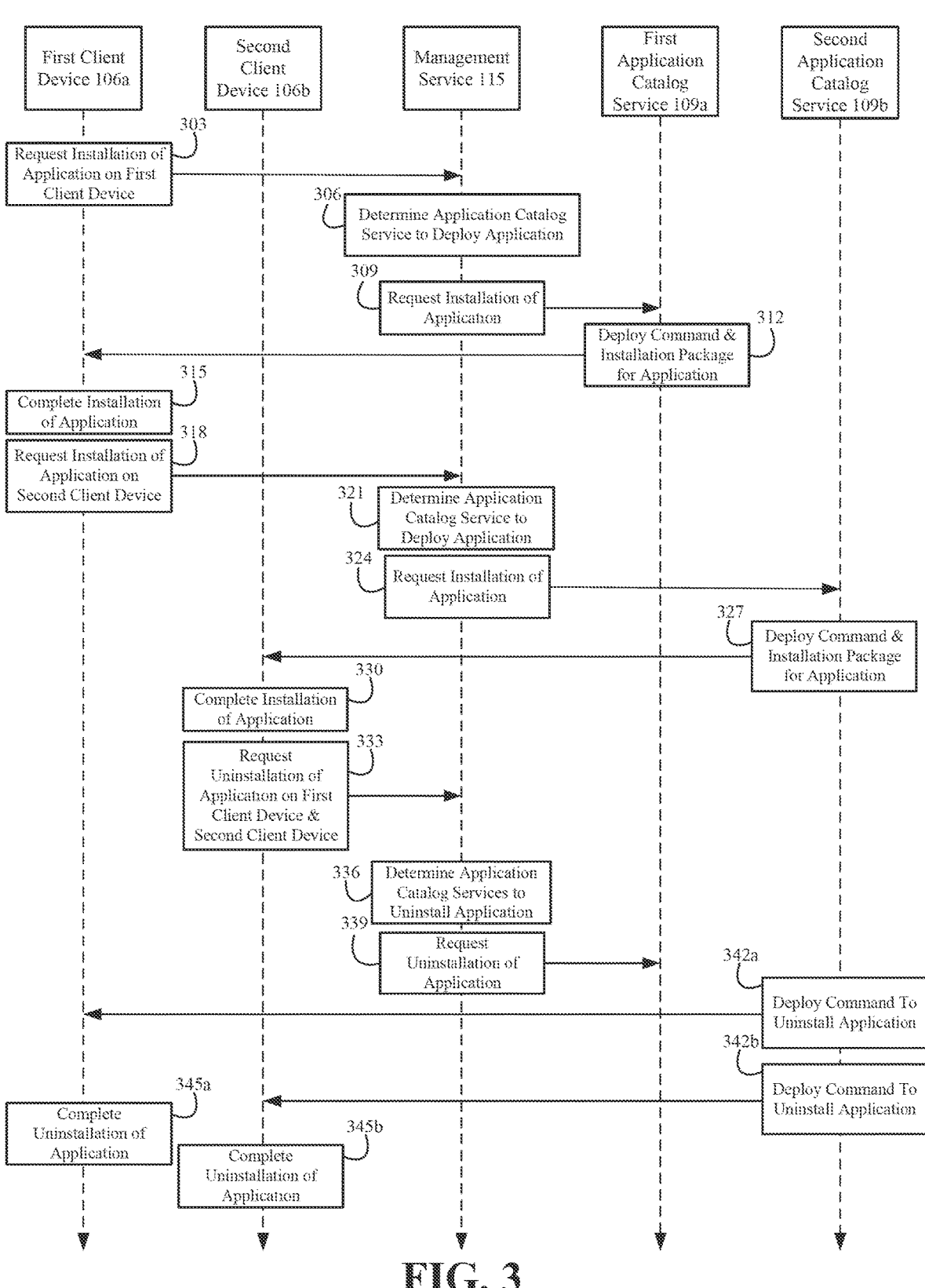
FIG. 3 shows a sequence diagram that provides one example of functionality implemented by components of the networked environment 100, according to various embodiments of the present disclosure.

FIG. 3 shows a sequence diagram that provides one example of functionality implemented by components of the networked environment 100. It is understood that the sequence diagram of FIG. 3 provides merely an example of the many different types of functional arrangements that can be employed to implement the portions of the networked environment 100 as described herein. As an alternative, the sequence diagram of FIG. 3 can be viewed as depicting an example of elements of a method implemented within the networked environment 100.

At step 303, a first client device 106a can request that a particular client application 127 be installed on the first client device 106a. The first client device 106a can provide a user interface 130 that presents one or more applications that may be installed on the user's client devices 106, including the first client device 106a. When a user selects to install a client application 127, the first client device 106a can generate an installation request and provide the request to the management service 115. The installation request can include an identifier of the first client device 106a and an identifier for the client application 127. The installation request can also identify the first client device 106a as the client device 106 on which the client application 127 will be installed. In some implementations, the first client device 106a can identify any configuration profile(s) 121 for configuring the client application 127.

At step 306, the management service 115 can determine an application catalog service 109 capable of deploying the client application 127 to the first client device 106*a*. For example, the identifier of the first client device 106*a* included with the installation request can indicate an operating system of the first client device 106*a*, and the management service 115 can identify an application catalog service 109 that includes applications compatible with that operating system. As another example, the application identifier included with the installation request can indicate which application catalog service 109 will deploy the client application 127.

At step 309, the management service 115 can request installation of the client application 127 from a first application catalog service 109*a*. The first application catalog service 109*a* can have been identified at step 306. The management service 115 can provide the request to the first application catalog service 109*a* a by calling an API provided by the first application catalog service 109*a*.

At step 312, the first application catalog service 109*a* can deploy a command to install the client application 127 to the first client device 106*a*, along with an installation package for the client application 127. After receiving the installation request for the client application 127, the first application catalog service 109*a* can identify the client application 127 from its catalog using, for instance, an application identifier included with the request. The first application catalog service 109*a* can generate an installation package that will enable the first client device 106*a* to install the client application 127. The first application catalog service 109*a* can include this installation package with a command to install the client application 127 and deploy the command to the first client device 106*a*, which the first application catalog service 109*a* can identify based on a device identifier included with the installation request.

At step 315, the first client device 106*a* can complete installation of the client application 127. The first client device 106*a* can install the client application 127 in response to the command received from the first application catalog service 109*a*. Likewise, the first client device 106*a* can install the client application 127 using the installation package received from the first application catalog service 109*a*.

At step 318, the first client device 106*a* can request installation of the client application 127 on a second client device 106*b*. A user can request that the client application 127 be installed on the second client device 106*b* using the user interface 130 provided by the first client device 106*a*. The installation request can include an identifier of the first client device 106*a*, an identifier for the client application 127, and an identifier of the second client device 106*ba* as the client device 106 on which the client application 127 will be installed. In this example, the client application 127 is a version of the same client application 127 installed in steps 303-315, though in other examples installation of a different client application 127 may be requested. Likewise, in this example, the first client device 106*a* uses a different operating system that the second client device 106*b*, though in other examples the two client devices 106 may use a same operating system.

At step 321, the management service 115 can determine which application catalog service 109 capable of deploying the client application 127 to the second client device 106*b*. For example, the identifier of the second client device 106*b* included with the installation request can indicate an operating system of the second client device 106*b*, and the management service 115 can identify an application catalog service 109 that includes applications compatible with that operating system. As another example, the application identifier included with the installation request can indicate which application catalog service 109 will deploy the client application 127.

At step 324, the management service 115 can request installation of the client application 127 from a second application catalog service 109*b*. In this example, a different application catalog service 109 will deploy the client application 127 to the second client device 106*a* since the first client device 106*a* and the second client device 106*b* use different operating systems. The second application catalog service 109*b* can be capable of deploying a version of the client application 127 compatible with the operating system of the second client device 106*b*. The management service 115 can provide the request to the second application catalog service 109*b* a by calling an API provided by the second application catalog service 109*b*.

At step 327, the second application catalog service 109*b* can deploy a command to install the client application 127 to the second client device 106*b*, along with an installation package for the client application 127. After receiving the installation request for the client application 127, the second application catalog service 109*b* can identify the client application 127 from its catalog using, for instance, an application identifier included with the request. The second application catalog service 109*b* can generate an installation package that will enable the second client device 106*b* to install the client application 127. The second application catalog service 109*b* can include this installation package with a command to install the client application 127 and deploy the command to the second client device 106*b*, which the second application catalog service 109*b* can identify based on a device identifier included with the installation request.

At step 330, the second client device 106*b* can complete installation of the client application 127. The second client device 106*b* can install the client application 127 in response to the command received from the second application catalog service 109*b*. Likewise, the second client device 106*b* can install the client application 127 using the installation package received from the second application catalog service 109*b*.

At step 333, the second client device 106*b* can request that the client application 127 be uninstalled from both the first client device 106*a* and the second client device 106*b* from the management service 115. A user can request uninstallation of the client application from these two client devices 106 using the user interface 130 provided by the second client device 106*b*. The uninstallation request can include identifiers of the first client device 106*a* and the second client device 106*b*, as well as identifiers for the versions of the client application 127 installed on the first client device 106*a* and the second client device 106*b*, respectively. In some implementations, however, the second client device 106*b* can itself complete uninstallation of the client application 127 on the second client device 106*b*, so the second client device 106*b* can simply request uninstallation of the client application 127 from the first client device 106*a*.

At step 336, the management service 115 can determine which application catalog services 109 capable of uninstalling the client application 127. As above, the management service 115 can make this determination based on, for example, identifiers of the first client device 106*a* and the second client device 106*b* received at step 333. As another example, the management service 115 can make this determination based on application identifiers for the versions of the client application 127 installed on the first client device 106*a* and the second client device 106*b*, respectively.

At step 339, the management service 115 can request uninstallation of the client application 127 from the application catalog services 109 identified at step 336. The management service 115 can request uninstallation of the client application 127 on the first client device 106*a* from the first application catalog service 109*a*. Likewise, the management service 115 can request uninstallation of the client application 127 on the second client device 106*b* from the second application catalog service 109*b*. In some implementations, however, the management service 115 can itself provide a command to uninstall the client application 127 directly to the first client device 106*a* and/or the second client device 106*b* rather than requesting uninstallation from the first application catalog service 109*a* and/or the second application catalog service 109*b*.

At step 342*a*, the first application catalog service 109*a* can deploy a command to uninstall the client application 127 to the first client device 106*a*. Likewise, at step 342*b*, the second application catalog service 109*b* can deploy a command to uninstall the client application 127 to the second client device 106*b*.

At step 345*a*, the first client device 106*a* can complete uninstallation of the client application 127 in response to the command received from the first application catalog service 109*a*. And at step 345*b*, the second client device 106*b* can complete uninstallation of the client application 127 in response to the command received from the second application catalog service 109*b*.

Functionality attributed to the executable components discussed herein can be implemented in a single process or application or in multiple processes or applications. The separation or segmentation of functionality as discussed herein is presented for illustrative purposes only.

Flowcharts and sequence diagrams can show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams can show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices and other hardware components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the various executable software components can be stored in one or more storage devices and be executable by one or more processors. Also, a data store can be stored in the one or more storage devices.

The functionalities described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refer to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

What is claimed is:

1. A system comprising:

at least one computing device comprising a processor and a memory; and machine-readable instructions stored in the memory that, when executed by the processor, cause the at least one computing device to at least:

enroll, for management at a management server, a first client device associated with a user account and a second client device associated with the user account, wherein enrolling includes loading a management agent on the respective first and second client devices, the management agent on the respective first and second client devices configured to communicate with the management server to obtain and execute device-specific commands from a command queue maintained by the management server;

provide, from the management server to the first client device, a catalog of applications that can be installed on the first client device or the second client device, wherein the catalog of applications is rendered by the management agent in a graphical user interface that enables cross-device installation of applications;

receive an installation request for a client application that is one of the applications in the catalog, from the first client device to the management server, the installation request being made via input on the user interface of the first client device and specifying the second client device on which the client application is to be installed;

identify an operating system associated with the second client device;

identify a version of the client application executable on the operating system of the second client device;

determine whether the client application identified in the installation request is a public application available from an external catalog service or an internal application associated with a configuration profile containing one or more configuration settings managed by the management server;

in response to determining that the client application is the internal application, retrieve, by the management server, the configuration profile for the version of the client application and place, in the command queue, a command for the management agent to install the version of the client application on the second client device and to apply the configuration profile containing the one or more configuration settings to the version of the client application installed on the second client device, wherein the second client device installs the version of the client application and applies the configuration profile to the installed version of the client application; and in response to determining that the client application is a public application, transmit, by the management server to the external catalog service, an application programming interface (API) request to generate an installation package for the version of the client application, wherein the external catalog service causes the installation package to be delivered to the second client device for installation of and wherein the version of the client application is installed on the second client device.

2. The system of claim 1, wherein the machine-readable instructions further cause the at least one computing device to at least identify the second client device based at least in part on a device identifier associated with the second client device, the device identifier being one of a plurality of device identifiers associated with the user account.

3. The system of claim 1, wherein the machine-readable instructions further cause the at least one computing device to at least:

receive an uninstallation request for the client application from the first client device; and place, in the command queue, a second command to uninstall the client application by the management agent on the second client device.

4. The system of claim 1, wherein the client application comprises a virtual application or a native application.

5. The system of claim 1, wherein the version of the client application is not compatible with an operating system of the first client device.

6. The system of claim 1, wherein the configuration profile is at least one of a virtual private network (VPN) certificate, a Wi-Fi profile, or an email profile.

7. A method, comprising:

enrolling, for management at a management server, a first client device associated with a user account and a second client device associated with the user account, wherein enrolling includes loading a management agent on the respective first and second client devices, the management agent on the respective first and second client devices configured to communicate with the management server to obtain and execute device-specific commands from a command queue maintained by the management server;

providing, from the management server to the first client device, a catalog of applications that can be installed on the first client device or the second client device, wherein the catalog of applications is rendered by the management agent in a graphical user interface that enables cross-device installation of applications across different operating systems;

receiving an installation request for a client application that is one of the applications in the catalog, from the first client device to the management server, the installation request being made via input on the user interface of the first client device and specifying the second client device on which the client application is to be installed;

identifying an operating system associated with the second client device;

identifying a version of the client application executable on the operating system of the second client device;

determining whether the client application identified in the installation request is a public application available from an external catalog service or an internal application associated with a configuration profile containing one or more configuration settings managed by the management server;

determining that the client application is the internal application; and retrieving, by the management server, the configuration profile for the version of the client application and placing, in the command queue, a command for the management agent to install the identified version of the client application on the second client device and to apply the configuration profile containing the one or more configuration settings to the version of the client application installed on the second client device, wherein the second client device installs the version of the client application and applies the configuration profile to the installed version of the client application, wherein in response to determining that the client application is a public application, the management server transmits to the external catalog service, an application programming interface (API) request to generate an installation package for the version of the client application, wherein the external catalog service causes the installation package to be delivered to the second client device and wherein the version of the client application is installed on the second client device.

8. The method of claim 7, further comprising identifying the second client device based at least in part on a device identifier associated with the second client device, the device identifier being one of a plurality of device identifiers associated with the user account.

9. The method of claim 7, further comprising:

receiving an uninstallation request for the client application from the first client device; and placing, in the command queue, a second command to uninstall the client application by the management agent on the second client device.

10. The method of claim 7, wherein the client application comprises a virtual application or a native application.

11. The method of claim 7 wherein the version of the client application is not compatible with an operating system of the first client device.

12. A non-transitory computer-readable medium embodying program instructions that, when executed, cause at least one computing device to at least:

enroll, for management at a management server, a first client device associated with a user account and a second client device associated with the user account, wherein enrolling includes loading a management agent on the respective first and second client devices, the management agent on the respective first and second client devices configured to communicate with the management server to obtain and execute device-specific commands from a command queue maintained by the management server;

provide, from the management server to the first client device, a catalog of applications that can be installed on the first client device or the second client device, wherein the catalog of applications is rendered by the management agent in a graphical user interface that enables cross-device installation of applications across different operating systems;

receive an installation request for a client application that is one of the applications in the catalog, from the first client device to the management server, the installation request being made via input on the user interface of the first client device and specifying the second client device on which the client application is to be installed;

identify an operating system associated with the second client device;

identify a version of the client application executable on the operating system of the second client device;

determine whether the client application identified in the installation request is a public application available from an external catalog service or an internal application associated with a configuration profile containing one or more configuration settings managed by the management server;

in response to determining that the client application is the internal application, retrieve, by the management server, the configuration profile for the version of the client application and place, in the command queue, a command for the management agent to install the version of the client application on the second client device and to apply the configuration profile containing the one or more configuration settings to the version of the client application installed on the second client device, wherein the second client device installs the version of the client application and applies the configuration profile to the installed version of the client application; and in response to determining that the client application is a public application, transmit, by the management server to the external catalog service, an application programming interface (API) request to generate an installation package for the version of the client application, wherein the external catalog service causes the installation package to be delivered to the second client device for installation of and wherein the version of the client application is installed on the second client device.

13. The non-transitory computer-readable medium of claim 12, wherein the program instructions further cause the at least one computing device to at least identify the second client device based at least in part on a device identifier associated with the second client device, the device identifier being one of a plurality of device identifiers associated with the user account.

14. The non-transitory computer-readable medium of claim 12, wherein the program instructions further cause the at least one computing device to at least:

receive an uninstallation request for the client application from the first client device; and place, in the command queue, a second command to uninstall the client application by the management agent on the second client device.

* * * * *